United States Patent
Kobb

(10) Patent No.: US 7,356,246 B1
(45) Date of Patent: Apr. 8, 2008

(54) METHOD AND SYSTEM FOR EXTENDING RECORDING

(75) Inventor: Michael J Kobb, Belmont, CA (US)

(73) Assignee: Digital Networks North America, Inc., Santa Clara, CA (US)

( * ) Notice: Subject to any disclaimer, the term of this patent is extended or adjusted under 35 U.S.C. 154(b) by 1107 days.

(21) Appl. No.: 09/855,813

(22) Filed: May 14, 2001

Related U.S. Application Data

(60) Provisional application No. 60/237,746, filed on Oct. 1, 2000.

(51) Int. Cl.
*H04N 5/91* (2006.01)

(52) U.S. Cl. .......................... 386/83; 725/58

(58) Field of Classification Search ................. 386/46, 386/83, 52, 55; 725/37, 39, 58
See application file for complete search history.

(56) References Cited

U.S. PATENT DOCUMENTS

| | | |
|---|---|---|
| 5,333,091 A | 7/1994 | Iggulden et al. |
| 5,455,630 A | 10/1995 | McFarland et al. |
| 5,682,206 A * | 10/1997 | Wehmeyer et al. ........... 725/37 |
| 5,692,093 A | 11/1997 | Iggulden et al. |
| 5,696,866 A | 12/1997 | Iggulden et al. |

(Continued)

FOREIGN PATENT DOCUMENTS

AU 694568 3/1996

(Continued)

OTHER PUBLICATIONS

TiVo, *Viewer's Guide for the Philips Personal Video Recorder*, TiVo Software Version 1.3, [online] [retrieved on Aug. 15, 2001]. Retrieved from the Internet <URL http://www.tivo.com/support/viewersguide_Philips_1_3.asp>, 3 pages.

(Continued)

*Primary Examiner*—Vincent Boccio
(74) *Attorney, Agent, or Firm*—McDonnell Boehnen Hulbert & Berghoff LLP

(57) ABSTRACT

A digital video recorder (DVR) is user-configurable to start recording before a scheduled start of a program. The DVR displays an electronic program guide having a graphical indicator that the DVR is configured to start recording a program early. When a user commands the DVR to play back the recorded program, the DVR begins playing the program at the position corresponding to the scheduled start time, as opposed to the actual recording start time. If desired, the user can "rewind" the program and view the portions of the program recorded prior to the scheduled start time. The DVR can display a counter counting the time base for the recorded program. The counter displays time elapsed since the scheduled start time and counts portions of the program recorded before the scheduled start time as negative time.

38 Claims, 10 Drawing Sheets

U.S. PATENT DOCUMENTS

| | | | |
|---|---|---|---|
| 5,987,210 A | 11/1999 | Iggulden et al. | |
| 5,999,688 A | 12/1999 | Iggulden et al. | |
| 6,141,488 A * | 10/2000 | Knudson et al. | 386/83 |
| 6,208,799 B1 * | 3/2001 | Marsh et al. | 386/83 |
| 6,215,526 B1 | 4/2001 | Barton et al. | 348/473 |
| 6,233,389 B1 | 5/2001 | Barton et al. | 386/46 |
| 6,311,011 B1 * | 10/2001 | Kuroda | 386/83 |
| 6,411,771 B1 * | 6/2002 | Aotake | 386/52 |

FOREIGN PATENT DOCUMENTS

| | | |
|---|---|---|
| EP | 0 693 215 B1 | 11/1998 |
| WO | WO 92/22983 * | 12/1992 |

OTHER PUBLICATIONS

TiVo, "Chapter 2, The Basics in 5 Short Tours," *Viewer's Guide for the Philips Personal Video Recorder*, TiVo Software Version 1.3, [online] [retrieved on Aug. 15, 2001]. Retrieved from the Internet <URL http://www.tivo.com/support/viewersguide_Philips_1_3.asp>, 12 pages.

TiVo, "Chapter 3, In Depth," *Viewer's Guide for the Philips Personal Video Recorder*, TiVo Software Version 1.3, [online] [retrieved on Aug. 15, 2001]. Retrieved from the Internet <URL http://www.tivo.com/support/viewersguide_Philips_1_3.asp>, 26 pages.

* cited by examiner

METHOD AND SYSTEM FOR EXTENDING RECORDING

CROSS-REFERENCE TO RELATED APPLICATION

This application claims the benefit of U.S. provisional patent application No. 60/237,746, which was filed on Oct. 1, 2000, and is hereby incorporated by reference herein.

BACKGROUND

1. Field of the Invention

This invention pertains in general to recording multimedia content and pertains in particular to digital video recorders for recording and playing back video.

2. Background Art

Modern multimedia recording devices, such as video cassette recorders (VCRs) and digital video recorders (DVRs), often contain electronic program guides (EPG) that consumers utilize to specify programs to record. For example, a DVR may connect to a central server and download an EPG listing the starting and ending times of all programs carried by all channels received by that DVR in the next week. Typically, the central server also synchronizes a clock in the DVR. A user then utilizes the EPG to select the programs for the DVR to record. When the clock indicates that a specified program is starting, the DVR automatically records the program for the length of time indicated by the EPG.

While in theory the example described above should work perfectly, in practice errors may occur. For example, the clock in the recording device or server might not be perfectly accurate, or might not be synchronized with the clock utilized by the broadcaster. In addition, the program might start early or late, or run past the scheduled end time. Frequently, a program's start time will vary; sometimes the program will start on time, while other times the program will start late. For example, a sports program shown before the specified program might occasionally delay the program's start time by a variable amount.

Often, for whatever reason, the recording device simply starts recording a few seconds after the start of the program. Certain programs contain interesting material at the very beginning (such as the chalkboard scene in "The Simpson's") and the user may be annoyed to find that the recording device failed to record such material.

Accordingly, there is a need in the art for a way to record programs that does not suffer from the deficiencies described above.

DISCLOSURE OF THE INVENTION

The above need is met by a digital video recorder (DVR) configured to start recording before the scheduled start of a program. When a user commands the DVR to play back the recorded program, the DVR begins playing the program at the position corresponding to the scheduled start time, as opposed to the actual recording start time. If desired, the user can "rewind" the program and view the portions of the program recorded prior to the scheduled start time. If the program in fact started on time, no additional user action is required.

The DVR preferably has a processor coupled in communication with a channel guide database, a criteria database, video storage, and a program logic memory. The processor controls the operation of the DVR and preferably acts under control of program logic modules stored in the program logic memory. The program logic modules include a user interface module for displaying a user interface on a television or other display device in communication with the DVR. The user interface allows a user to interact with the DVR and provide criteria indicating programs to record or play back, modify the record times, and/or control other aspects of the DVR. In addition, the user interface allows a user to fast forward, "rewind," or pause playback of recorded programming.

The DVR preferably stores received channel guide data in the channel guide database. The channel guide data contains information such as the start and stop times of programs carried on various television channels. The criteria database stores criteria for selecting programming from the channel guide database. Preferably, the user uses the user interface to specify criteria identifying programs for the DVR to record.

As mentioned above, the user interface allows the user to modify the start and stop times of a scheduled recording of a program. For example, a user can schedule the recording to start a few minutes early to ensure that the opening scenes of a program are recorded. Preferably, the recorded programs are stored in the video storage. In a preferred embodiment, the video storage is a high-capacity, rewriteable, randomly-accessible recording medium such as a hard disk.

The user also uses the user interface to cause the DVR to play a recorded program. In response, the DVR plays the program from the beginning. According to a preferred embodiment of the present invention, the DVR treats the point in the recorded program corresponding to the scheduled program start time as the "beginning." The user can access the portion of the program recorded prior to the scheduled start time by "rewinding" the program to the scheduled start time during playback of the program.

In one embodiment of the present invention, the DVR displays a counter counting the time base for the recorded program. Preferably, the counter displays time elapsed since the scheduled start time. The counter preferably counts portions of the program recorded before the scheduled start time in negative time.

DETAILED DESCRIPTION OF THE PREFERRED EMBODIMENTS

Figure 1:
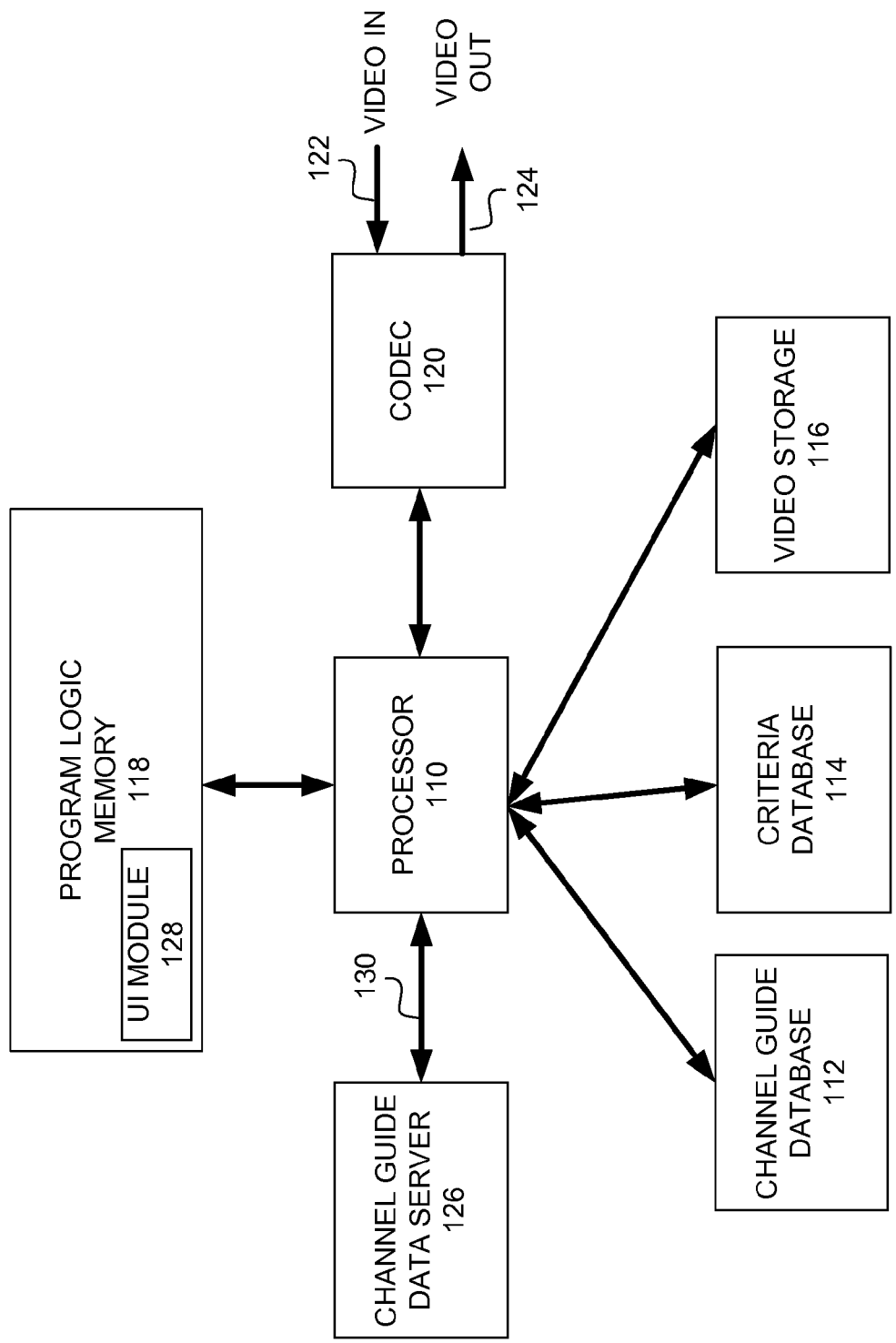
FIG. 1 is a high-level block diagram illustrating a digital video recorder (DVR) and associated devices according to an embodiment of the present invention.

FIG. 1 is a high-level block diagram illustrating a digital video recorder (DVR) 100 and associated devices according to an embodiment of the present invention. The DVR 100 is preferably utilized for digitally recording and playing back television programs and other video data. It will be understood by those of ordinary skill in the art that the present invention can be utilized in any recording device, whether digital or analog. Moreover, the present invention can be used in devices that record any type of media, such as video, audio, streaming data, and/or some combination thereof. In a preferred embodiment of the present invention, the recording device is a DVR and, accordingly, this description will use the term "DVR" throughout. However, the term "DVR" is intended to include any alternate types of recording devices, such as video cassette recorders (VCRs). The DVR may be a separate device, or incorporated into other devices such as personal computers, set-top boxes (STBs), and televisions.

FIG. 1 illustrates a processor 110 coupled in communication with a channel guide database 112, a criteria database 114, video storage 116 (also referred to as the "recording medium"), program logic memory 118, a video compressor/decompressor (CODEC) 120, a video input 122, a video output 124, and a channel guide data server 126.

As is known in the art, the processor 110 preferably controls the operation of the DVR 100. The processor 110 is preferably a commercially available microprocessor such as a MIPS-based processor from Philips Semiconductors. The processor 110 preferably acts under control of program logic modules stored in the program logic memory 118 to perform the functions attributed herein to the processor or DVR. Alternatively, the program logic modules may be stored elsewhere within the DVR 100. As used herein, the term "module" refers to software computer program logic and/or any hardware or circuitry utilized to provide the functionality attributed to the module.

In a preferred embodiment, the program logic memory 118 holds a user interface (UI) module 128 for displaying a UI on a television or other display device in communication with the DVR 100. The UI allows a user to interact with the DVR 100 and provide criteria indicating programs to record or play back, modify the record times for programs, and/or control other aspects of the DVR 100. In addition, the UI allows a user to fast forward, rewind, or pause recorded programming. Since all programming passing through the DVR 100 is preferably at least temporarily recorded, the UI allows the user to fast forward, rewind, or pause "live" television.

The channel guide data server 126 is preferably separate from the DVR 100 and coupled to the DVR 100 via a network connection 130. In one embodiment, the data server 126 is located remote from the DVR 100 and communicates with multiple DVRs via Internet connections, direct modem connections, or other types of network connections. In alternative embodiments, the data server 126 communicates with the DVR 100 via a shared communications channel, such as within the video blanking interval (VBI) of the television signal.

The channel guide data server 126 provides channel guide data including program titles, start times, end times, channel information, and other data, such as ratings, descriptions of shows, names of actors and directors, etc., to the DVR 100. Preferably, the channel guide data are obtained from a commercially available source, such as Tribune Media. Preferably, the DVR 100 periodically accesses the channel guide data server 126 to download the most recent channel guide data. In alternative embodiments, the DVR receives continuously updated channel guide data. The DVR 100 preferably stores the received channel guide data in the channel guide database 112. In a preferred embodiment, the database 112 is stored on the recording medium 116. However, alternative embodiments of the present invention may use alternative storage media.

In one alternative embodiment, the primary channel guide data are stored on the server 126 and accessed via the network connection 130 when needed by the DVR 100. In this embodiment, the locally-stored channel guide database 112 is preferably replaced by a "match" database. The match database preferably stores channel guide data for programs that match selection criteria input by a user of the DVR 100. This embodiment reduces the amount of storage at the DVR 100 required to store the channel guide data.

The CODEC 120 preferably receives video input signals from the video input 122 and outputs video signals onto the video output 124. The video input 122 receives video signals from a broadcast antenna, coaxial cable, STB, digital communications link, or any other source. Preferably, the CODEC 120 digitizes the received video signal and optionally compresses the signal using Moving Pictures Expert Group (MPEG) compression. The CODEC 120 also preferably converts the digitized video signals into analog signals and provides the analog signals to the video output 124. The video output preferably passes the signal to a display device such as a television. Those of skill in the art will recognize that the functionality of the CODEC 120 can be optionally disabled depending upon the embodiment of the present invention. For example, the CODEC 120 can receive digital signals from an upstream digital device and/or provide digital output signals to a downstream digital device.

The criteria database 114 stores criteria for selecting programming from the channel guide database 112. In one embodiment, the criteria database 114 is stored on the recording medium 116. Preferably, the user uses the UI to specify criteria identifying programs for the DVR 100 to record. For example, the user may specify a program by selecting the program from an EPG, manually specifying that the DVR 100 record from a certain channel at a certain time, specifying that the DVR 100 record any program containing a certain word in its title, or by some combination or variation of these techniques. When the criteria in the criteria database 114 match a program contained in the channel guide database 112, the processor 110 and program logic cause the DVR 100 to record the program.

Preferably, the recorded programs are stored in the video storage 116. In a preferred embodiment, the video storage 116 is a high-capacity, rewriteable, randomly-accessible recording medium such as a hard disk. In one embodiment, the video storage 116 utilizes the same disk that stores the channel guide 112 and criteria databases 114.

The randomly-accessible recording medium 116 provides certain advantages over sequential recording media, such as tape-based devices. For example, the DVR 100 can simultaneously record and play back video signals. In addition, a user may view a program as it is being recorded and take advantage of features such as rewind, pause, and fast forward. However, in alternative embodiments a sequential recording medium may be utilized without departure from certain aspects of the present invention.

Figure 2:
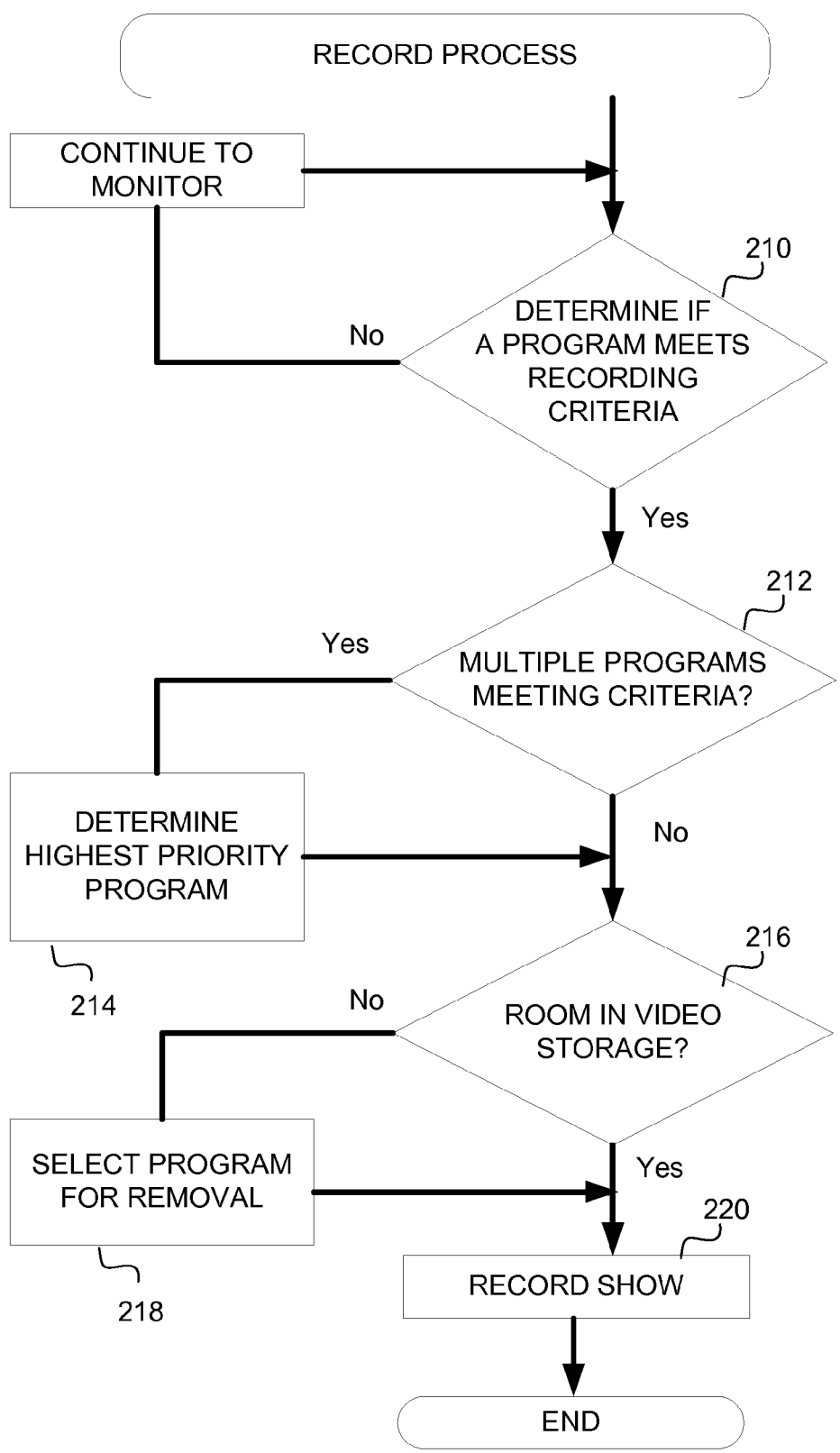
FIG. 2 is a flowchart illustrating a method for recording programming with the DVR according to an embodiment of the present invention.

FIG. 2 is a flowchart illustrating a method for recording programming with the DVR 100 according to an embodiment of the present invention. Initially, the processor 110 monitors the criteria 114 and channel guide 112 databases to determine 210 whether programming is available that meets the criteria. If programming is available that meets the criteria, the processor 110 preferably determines 212 whether multiple programs simultaneously meet the criteria. One embodiment of the DVR 100 can record from only a single video input signal 122 at a time. Alternative embodiments have the capability to simultaneously record multiple video input signals (or multiple programs carried on different television channels). If the number of programs currently meeting the criteria exceeds the number of video input signals that the DVR can record simultaneously, the processor 110 preferably determines 214 and selects the highest priority program. This determination can be made, for example, in response to priority information entered by the user or by a heuristic applied by the processor 110.

Preferably, the processor next determines 216 whether the video storage 116 has enough room to record the selected program. If there is room in the storage 116, the DVR 100 records 220 the program. The DVR 100 also preferably associates data from the channel guide database 112, such as the name and description of the program, with the recorded program in the video storage 116.

If there is not enough room in the storage 116 to record the entire program, the processor 110 preferably selects 218 a program for deletion from storage. In one embodiment, the processor selects a program for removal if it is a lower priority than the program to be recorded. In another embodiment, the DVR 100 dedicates a predetermined amount of space to programs of a certain type (e.g., the DVR 100 devotes enough storage to store three episodes of "The Simpson's"). If the dedicated space is full, the DVR 100 deletes the oldest program in the space to make room for the new program of the same type. Other embodiments of the present invention can use different heuristics to select a program for removal. Alternatively, embodiments of the present invention can also opt not to record a program if there is no room available in the video storage 116.

Figure 3:
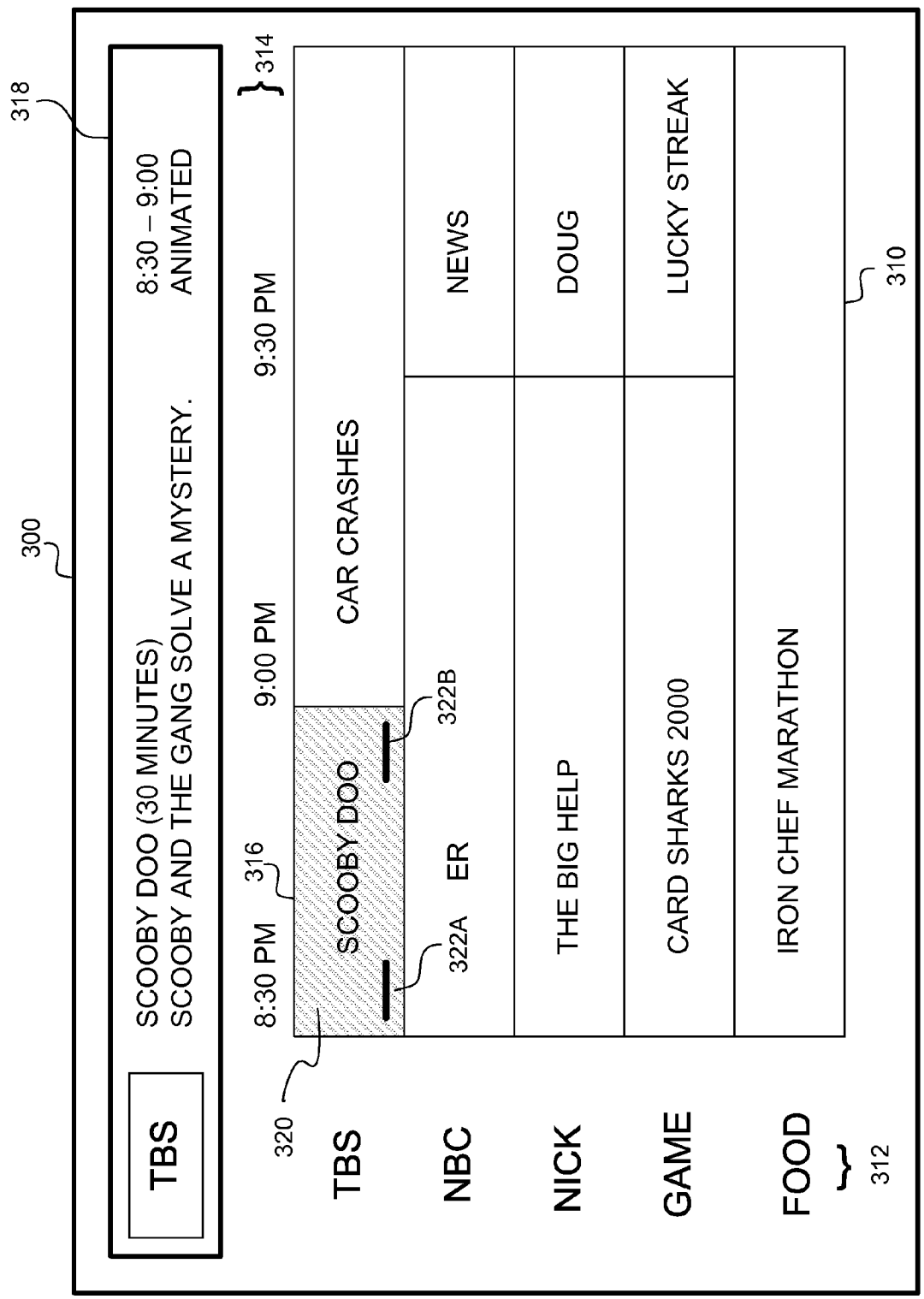
FIG. 3 is a diagram illustrating an electronic program guide (EPG) displayed by the DVR according to an embodiment of the present invention.

FIG. 3 is a diagram illustrating an EPG 300 displayed by the DVR 100 on a television or other display device according to an embodiment of the present invention. Those of skill in the art will recognize that FIG. 3 illustrates only one possible EPG 300 and there are many possible variants within the scope of the present invention. The EPG 300 preferably contains data from the channel guide database 112 and is displayed according to the UI module 128. In a preferred embodiment of the present invention, the channel guide data is displayed in a grid 310. Channels 312 are displayed down the left side of the grid while times 314 are displayed across the top. The programs shown on a particular channel are indicated by the names to the right of the channels 312. Similarly, the start and stop times of programs are indicated by the vertical lines below certain times 314. For example, representative EPG entry 316 indicates that the program "Scooby Doo" will be shown on TBS from 8:30 pm to 9:00 pm.

Preferably, a user can highlight one or more of the programs in the channel guide by selecting the program through the UI. In FIG. 3, EPG entry 316 is cross-hatched to indicate that it is selected. Preferably, the EPG 300 displays a brief description 318 of the selected program. A consumer preferably uses the EPG 300 to select a program for the DVR 100 to record. In one embodiment, the EPG 300 displays a graphical indicator 320 identifying programs that the DVR 100 is scheduled to record.

Figure 4:
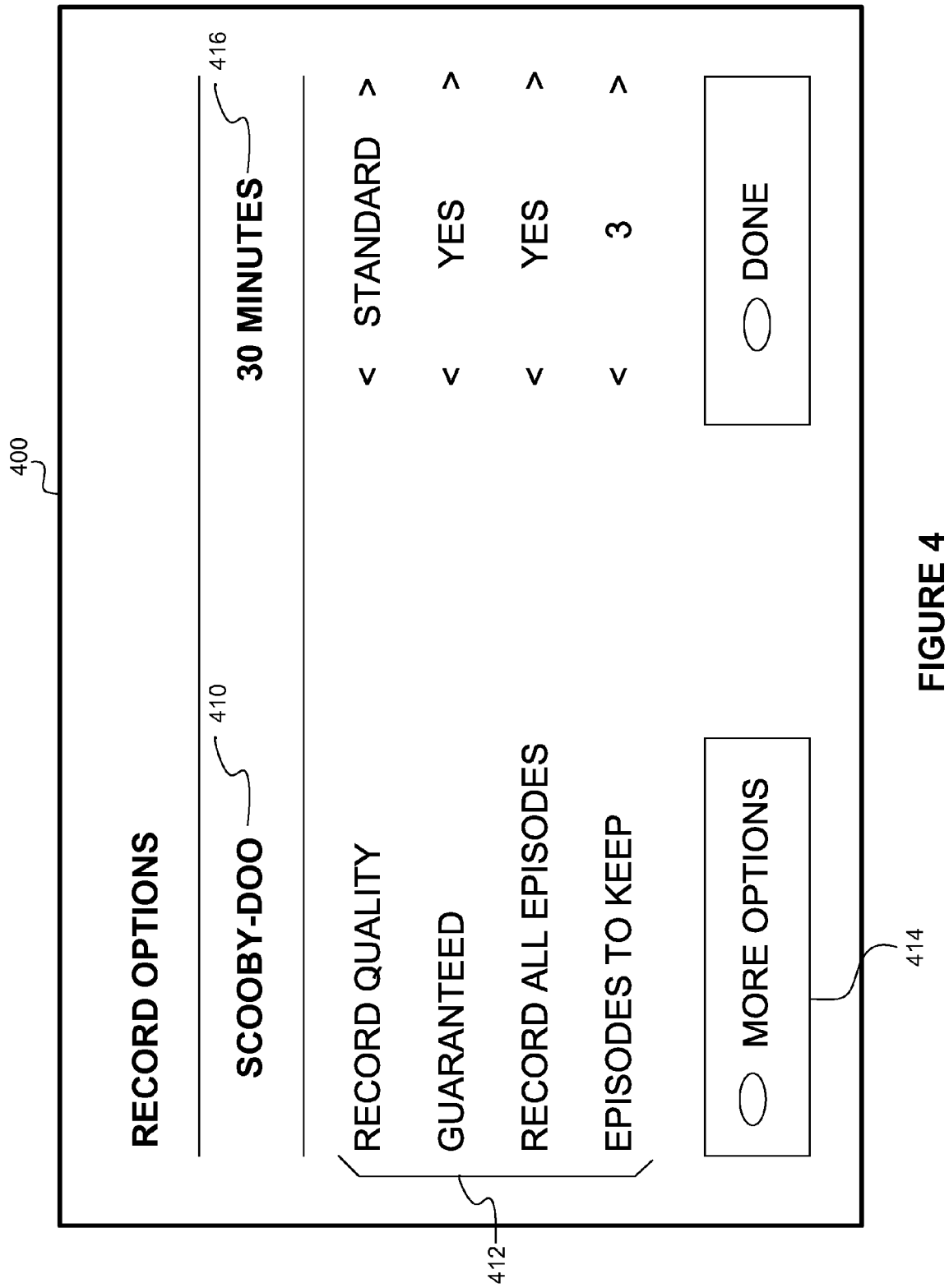
FIG. 4 is a diagram illustrating a user interface (UI) displayed by the DVR for setting record options according to an embodiment of the present invention.

FIG. 4 is a diagram illustrating the UI 400 for setting record options according to an embodiment of the present invention. As with the EPG 300 of FIG. 3, the Record Options UI 400 is preferably displayed on a television or other display device coupled to the DVR 100. In addition, those of skill in the art will recognize that many variations of the UI 400 are within the scope of the present invention.

Preferably, the Record Options UI 400 is displayed after a user selects a program to record from the EPG 300 of FIG. 3. The UI 400 displays the title of the program 410 and several different record options 412 that the user can set. For example, the user can set the recording quality level, indicate whether the recording should be guaranteed, indicate whether all episodes of the program should be recorded, and/or indicate the number of episodes for the DVR 100 to keep in video storage 116. The Record Options UI 400 also preferably displays a field 416 indicating the length of the program to be recorded.

Figure 5:
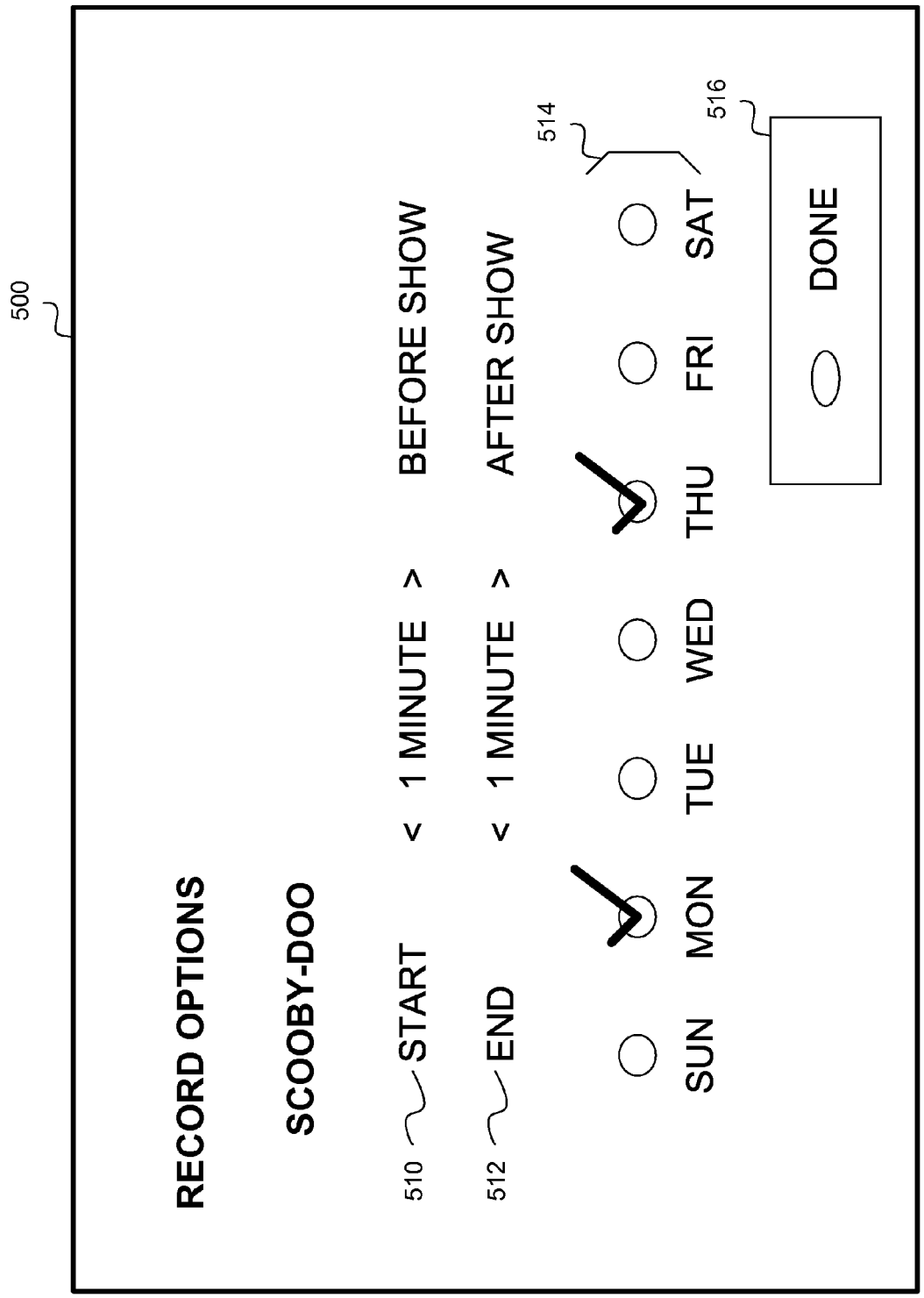
FIG. 5 illustrates a "More Options" UI displayed by the DVR according to an embodiment of the present invention.

In a preferred embodiment, a user can select a "more options" button 414 to access additional recording options. FIG. 5 illustrates the "More Options" UI 500 displayed when the user selects the "more options" button 414. As with the EPG 300 of FIG. 3, the More Options UI 500 is preferably displayed on a television or other display device coupled to the DVR 100. In addition, those of skill in the art will recognize that many variations of the UI 500 are within the scope of the present invention.

The More Options UI 500 preferably includes a start time modifier UI element 510 that allows a user to specify that the DVR 100 should start recording a channel a selected number of minutes before (or, in one embodiment, after) the scheduled start of the selected program. In one embodiment of the present invention, the user can specify that recording starts up to 240 minutes (four hours) before (or after) the scheduled program start. Similarly, a stop time modifier UI element 512 allows a user to specify that the DVR 100 should stop recording a channel a selected number of minutes after (or before) the scheduled stop time of a program. One embodiment of the present invention allows the user to vary the scheduled stop time by 240 minutes.

The start 510 and stop 512 time modifier UI elements allow the user to adjust the recording time to account for programs that often start earlier or last longer than scheduled. For example, a user can schedule the recording to start a few minutes early to ensure that the opening scenes of a program are always recorded. Some programs, notably sporting events, frequently run past the programs' scheduled stop times. Accordingly, the user can instruct the DVR 100 to stop recording a program well past the scheduled end time in order to ensure that the DVR records the end of the program.

The More Options UI 500 also preferably contains a day selector UI element 514 that allows a user to select the days that the DVR will record the indicated program. For example, TBS may broadcast a Scooby-Doo episode every day between 8:30-9:00 pm. Assume, however, that the user wants to only record the episodes broadcast on Mondays and Thursdays. Accordingly, the user uses the day selector UI element 514 to select only Monday and Thursday.

Preferably, when the user presses the "done" button 516 in the More Options UI 500, the user is returned to the Record Options UI 400 of FIG. 4. In a preferred embodiment of the present invention, the field 416 showing the length of the program to record is updated to include any modifications set by the user. Thus, if the user schedules the DVR 100 to begin recording a 30 minute program two minutes prior to the scheduled start time, the field will display "32 Minutes."

Returning to FIG. 3, a preferred embodiment of the present invention displays a visual indicator 322 in the EPG 300 indicating that the recording time for a program has been modified. Preferably, the indicator takes the form of a horizontal line 322A at the bottom left of the program name to indicate that the start record time is modified and a horizontal line 322B at the bottom right of the program name to indicate that the stop record time is modified. Those of skill in the art will recognize that many variations of the visual indicator 322 are within the scope of the present invention, such as varying the color of the program name.

Figure 6:
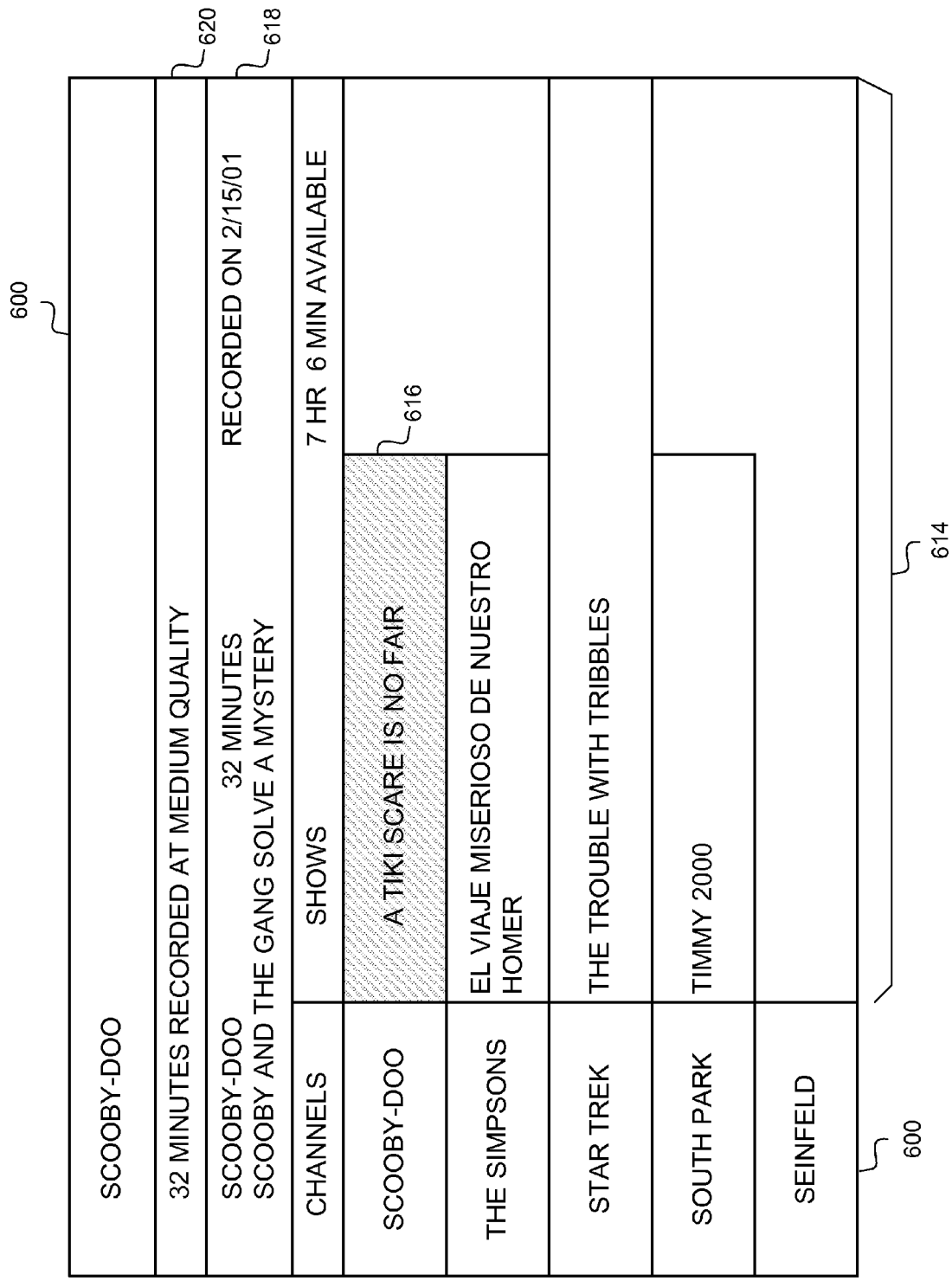
FIG. 6 illustrates a "Recorded Programs" UI displayed by the DVR according to an embodiment of the present invention.

The user preferably accesses a "Recorded Programs" UI 600 like that illustrated in FIG. 6 to view and select recorded programs for playback. As with the previously described UIs, the Recorded Programs UI 600 is preferably displayed on a television or other display device coupled to the DVR 100 and variations of the illustrated interface are within the scope of the present invention.

The UI 600 preferably illustrates a list 612 of "channels" showing programs that have been scheduled for recording. Adjacent to each channel is preferably a list 614 of programs that have been recorded on that channel. The list of programs 614 preferably identifies each program by the name retrieved from the channel guide database 112. Note that a channel can be program-based. As a result, a listed channel does not necessarily correspond to a broadcast channel. In a preferred embodiment of the present invention, a user can select one of the channels or recorded programs and additional information about the channel/program is displayed in an information window 618. In the example of FIG. 6, show 616, entitled "A Tiki Scare Is No Fair," is selected. A second information window 620 shows the length of the recorded program. In this example, the recorded length is 32 minutes, indicating that the 30 minute program was extended by two minutes.

Figure 7:
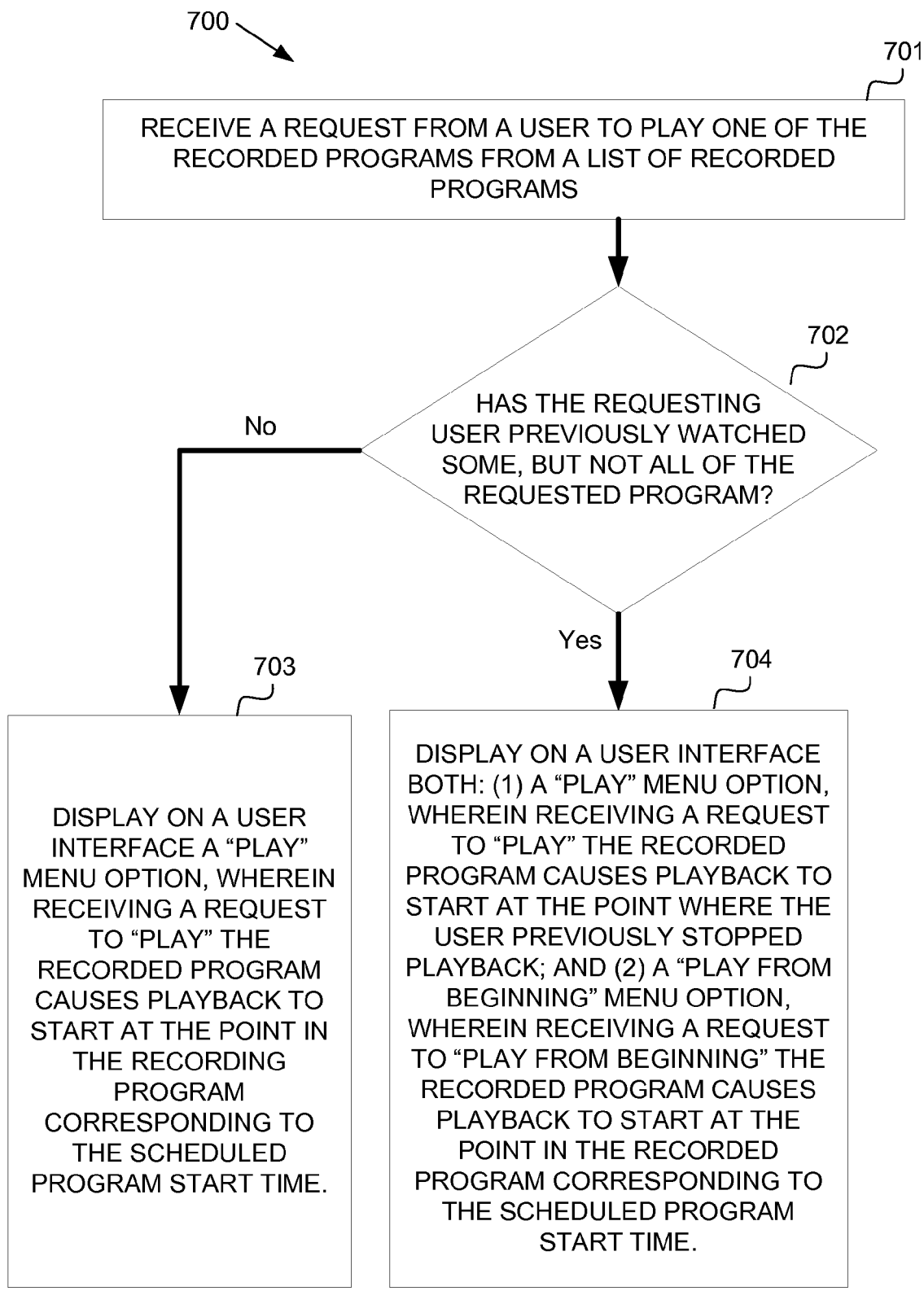
FIG. 7 is a flow chart illustrating a method to display on a user interface a menu option for playback according to one embodiment.

The user uses the Recorded Programs UI 600 to direct the DVR 100 to play one of the recorded programs, as shown in step 701 of method 700 in FIG. 7 which illustrates one embodiment of the present invention. At step 702, the system determines whether the user has previously watched some, but not all, of the requested program. If the user has previously watched some, but not all of the program (such as when the user watches a portion of the program and then stops playback), the Recorded UI 600 preferably presents the user with "Play" and "Play from beginning" menu choices, as shown in step 704. In this case, the "Play" menu choice causes playback to start at the point where the user stopped playback, as shown in step 704. If, however, the user has not previously watched the program, then the Recorded Programs UI 600 preferably presents the user with a "Play" menu choice that is the functional equivalent of the "Play from beginning" choice, as shown in step 703.

The "Play from beginning" and equivalent "Play" menu choices cause the DVR 100 to play the program from the beginning, as shown in steps 703 and 704. According to a preferred embodiment, the DVR 100 treats the point in the recorded program corresponding to the scheduled program start time (i.e., the start time in the channel guide database 112) as the "beginning." The user accesses the portion of the program recorded prior to the scheduled start time by "rewinding" the program during playback.

For example, assume that the user configured the DVR 100 to begin recording the episode "A Tiki Scare Is No Fair" two minutes earlier than the scheduled start time (thereby causing the recorded length to be 32 minutes). When the user directs the DVR 100 to play "A Tiki Scare Is No Fair" from the beginning (either by choosing "Play" or "Play from the beginning"), the DVR 100 actually begins playing the program at a point two minutes past when the DVR started recording. The user can use "reverse" or "instant replay" commands to view the portions of the program recorded prior to the scheduled start time.

In an alternative embodiment, the Recorded Programs UI 600 presents the user with multiple choices, including choices allowing the user to start the program from the true beginning (i.e., the point where recording started), the beginning as determined by the scheduled start time, or at the point where the user previously stopped playback of the program. This embodiment may be useful when the user desires to watch the padded portion (i.e., the portion recorded before the schedule start time) without having to rewind the program during playback.

In one embodiment of the present invention, the UI module 128 allows a user to cause a counter to be displayed during playback. The counter preferably displays a time base for the recorded program. In one embodiment, the counter displays the time base in the standard hours:minutes:seconds ("hh:mm:ss") format on an information bar displayed along the bottom of the television screen. Alternative embodiments of the counter illustrate the time base in different manners or are displayed in different locations.

The counter displays time elapsed since the scheduled start time. The counter preferably counts portions of the program recorded before the scheduled start time as negative time. Thus, the counter displays the true beginning of the "A Tiki Scare Is No Fair" program as "−00:02:00," the portion of the program corresponding to the scheduled start time as "00:00:00," and the portion four minutes past the actual recording start time as "00:02:00." If the user configures the DVR 100 to continue recording past a program's scheduled stop time, a preferred embodiment of the present invention continues to increment the counter as if the extra time was within the scheduled time.

In practice, it is possible for the actual start time of a record to be after the scheduled start time. For example, if the power is out at a program's scheduled start time, but power is restored during the program, the DVR 100 preferably records the program beginning at the point where power was restored. In a preferred embodiment of the present invention, the counter indicates the count in the same manner as if the recording started when scheduled. For example, if a program is scheduled to begin recording at 8:00 pm, but the DVR does not begin recording until 8:02, the counter preferably reads "00:02:00" at the start of the recorded program. In one embodiment of the present invention, the counter is altered or a message is displayed to the user to indicate that the DVR 100 was unable to record the first two minutes of the program. For example, the counter may be displayed in a special color to indicate that part of the program was not recorded, or a message may be displayed when the user tries to "rewind" before 00:02:00 explaining why the DVR 100 is unable to "rewind" prior to that point. In an alternative embodiment of the present invention, the counter counts the actual start of recording as "00:00:00" when the recording start is delayed.

An advantage of the present invention is that it allows a user to view portions at the beginning of a program that the viewer might have otherwise missed had the DVR 100 not been configured to start recording early, without the inconvenience of having to fast forward to the beginning of the program. Moreover, since the counter starts at the scheduled recording time, in most cases the counter will accurately indicate the count for the portion of the program being viewed. For example, if a program lasts for 30 minutes, and the counter indicates "00:17:30," a user will know that there are approximately 12 minutes 30 seconds remaining.

Figure 8:
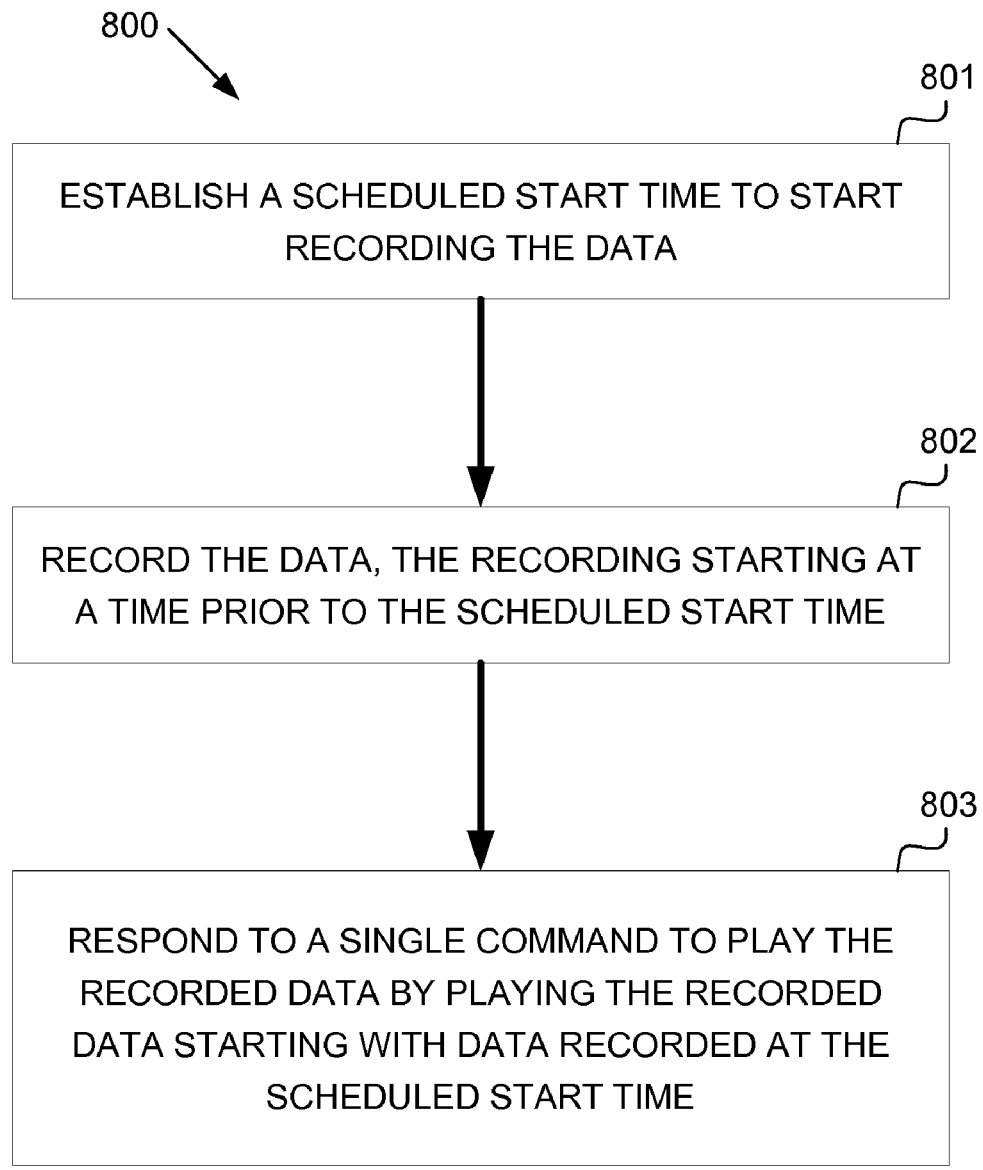
FIG. 8 is a flow chart illustrating a method according to one embodiment to record data and to play the recorded data.

FIG. 8 shows a flowchart of method 800 illustrating one embodiment of the present invention, comprising the steps of: (1) establishing a scheduled start time to start recording the data 801; (2) recording the data, the recording starting at a time prior to the scheduled start time 802; and (3) responsive to a single command to play the recorded data, playing the recorded data starting with data recorded at the scheduled start time 803.

Figure 9:
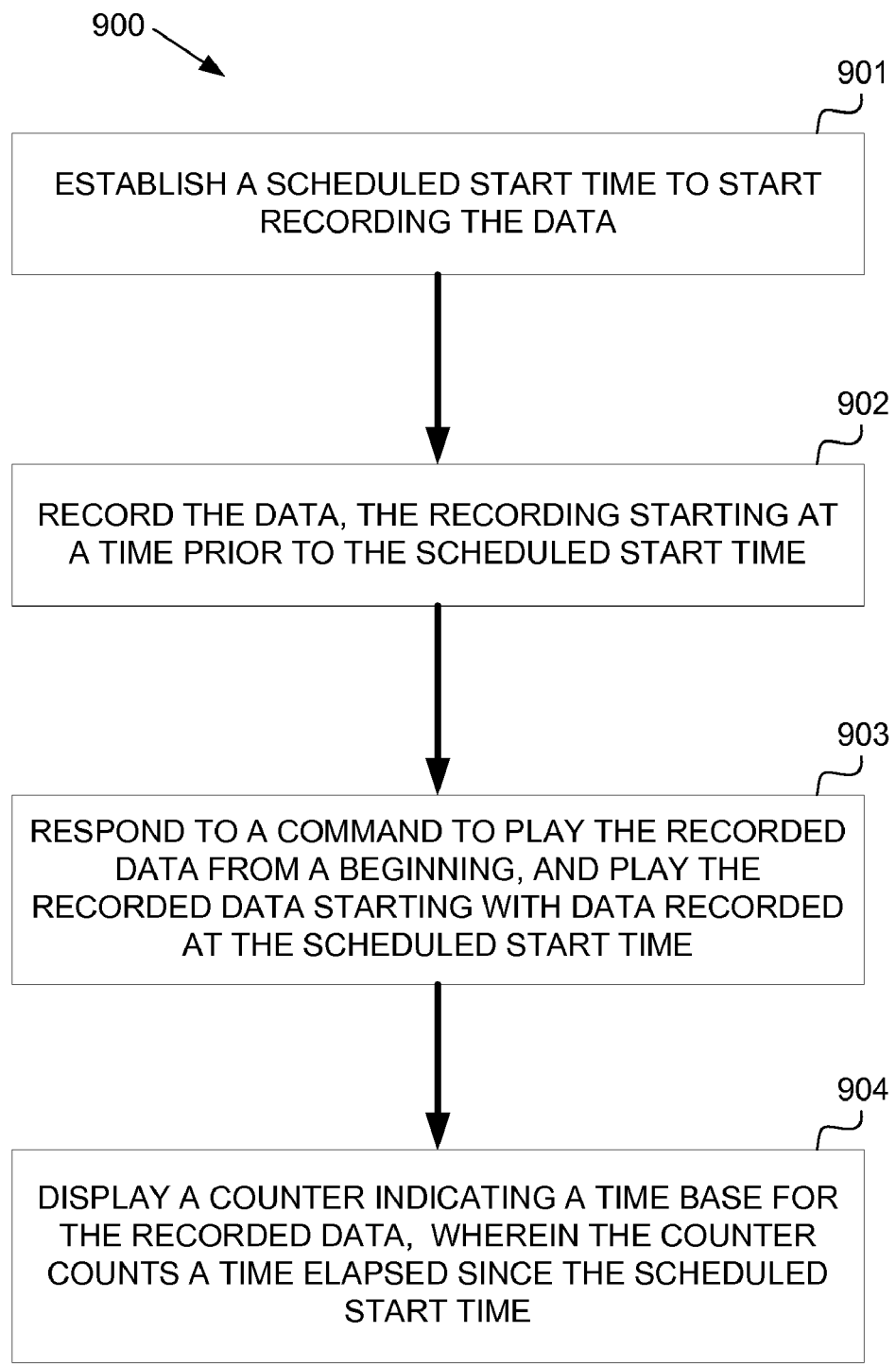
FIG. 9 is a flow chart illustrating a method according to a further embodiment to record data, to play the recorded data, and to display a counter counting a time elapsed since the scheduled start time.

FIG. 9 shows a flowchart of method 900 illustrating another embodiment of the present invention, comprising the steps of: (1) establishing a scheduled start time to start recording the data 901; (2) recording the data, the recording starting at a time prior to the scheduled start time 902; (3) responsive to a command to play the recorded data from a beginning, playing the recorded data starting with data recorded at the scheduled start time 903; and (4) displaying a counter indicating a time base for the recorded data, wherein the counter counts a time elapsed since the scheduled start time 904.

Figure 10:
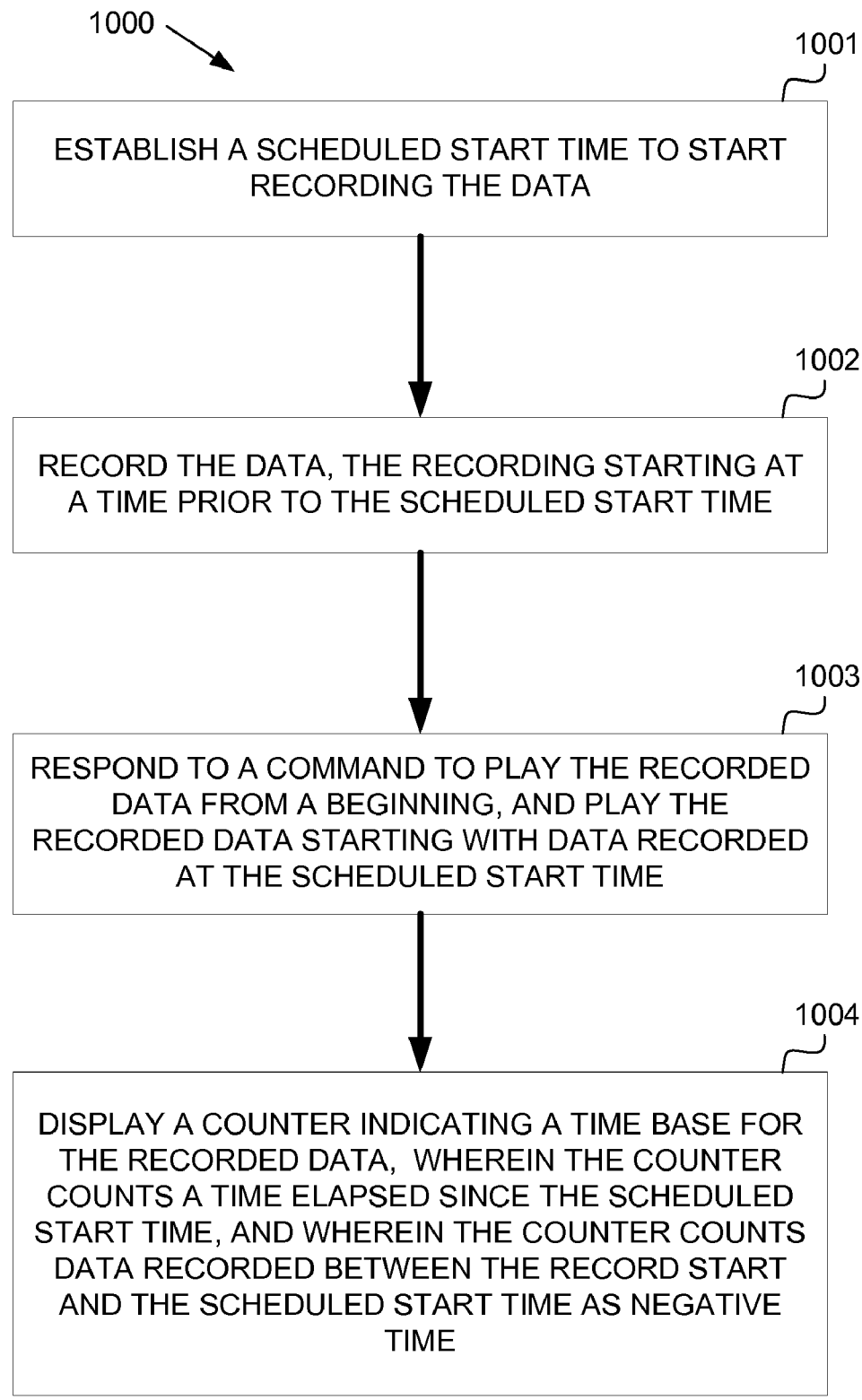
FIG. 10 is a flow chart illustrating a method according to a further embodiment to record data, to play the recorded data, and to display a counter counting the data recorded between the record start and the scheduled start time as negative time.

FIG. 10 shows a flowchart of method 1000 illustrating yet another embodiment of the present invention, comprising the steps of: (1) establishing a scheduled start time to start recording the data 1001; (2) recording the data, the recording starting at a time prior to the scheduled start time 1002; (3) responsive to a command to play the recorded data from a beginning, playing the recorded data starting with data recorded at the scheduled start time 1003; and (4) displaying a counter indicating a time base for the recorded data, wherein the counter counts a time elapsed since the scheduled start time, and wherein the counter counts data recorded between the record start and the scheduled start time as negative time 1004.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of recording data, comprising:
    establishing a scheduled start time to start recording the data;
    recording the data, the recording starting at a time prior to the scheduled start time; and
    responsive to a single command to play the recorded data, playing the recorded data starting with data recorded at the scheduled start time.

2. The method of claim 1, further comprising:
    responsive to receiving a command during playback of the data, playing back at least a portion of the data recorded prior to the scheduled start time.

3. The method of claim 1, wherein the recording step comprises the step of:
    recording the data onto a random-access recording medium.

4. The method of claim 1, further comprising the step of:
    displaying a counter indicating a time base for the recorded data.

5. The method of claim 4, wherein the counter counts a time elapsed since the scheduled start time.

6. The method of claim 4, wherein the counter counts data recorded between the record start and the scheduled start time as negative time.

7. The method of claim 1, further comprising the step of:
    displaying a user interface allowing selection of a record start time prior to the scheduled start time;
    wherein the recording step starts recording at the selected record start time.

8. A digital video recorder (DVR) for digitally recording video data, comprising:
    a random-access recording medium;
    an input for receiving the video data;
    a processor for controlling the operation of the DVR; and
    a program logic memory for storing program logic modules for execution by the processor, the modules comprising:
        a module for establishing a scheduled start time to start recording the video data to the recording medium;
        a module for recording the video data on the recording medium, the recording starting at a time prior to the scheduled start time; and
        a module for playing back the recorded data responsive to a single command to play the recorded data received by the DVR, the playback starting with the data recorded at the scheduled start time.

9. The DVR of claim 8, wherein the modules further comprise:
    a module for playing back at least a portion of the video data recorded prior to the scheduled start time responsive to a command received during playback of the recorded video data.

10. The DVR of claim 8, wherein the modules further comprise:
    a module for displaying a user interface allowing selection of a recording start time prior to the scheduled start time;
    wherein the module for recording the video data starts recording at the selected recording start time.

11. The DVR of claim 10, wherein the modules further comprise:
    a module for displaying a graphical indication that a recording start time prior to the scheduled start time is selected.

12. The DVR of claim 8, wherein the modules further comprise: a module for displaying a counter counting a time base for the recorded video data.

13. The DVR of claim 12, wherein the counter counts a time elapsed since the scheduled start time.

14. The DVR of claim 12, wherein the counter counts the time base of data recorded between the record start and the scheduled start time as negative time.

15. The DVR of claim 8, further comprising:
    a channel guide database operatively coupled to the processor for storing channel guide data, wherein the scheduled start time is established responsive to the channel guide data.

16. The DVR of claim 15, wherein the channel guide data identifies programs and further comprising:
   a criteria database operatively coupled to the processor for storing criteria for selecting one or more of the programs identified by the channel guide data, wherein the scheduled start time is established responsive to the one or more programs identified by the criteria database.

17. A computer program product comprising:
   a computer-usable medium storing instructions executed by a computer controlling a digital video recorder (DVR), the DVR adapted to receive video data, the computer-readable code comprising:
   a module establishing a scheduled time to start recording the video data;
   a module recording the video data starting at a time prior to the scheduled start time; and
   a module playing back the recorded data responsive to a single command to play the recorded data received by the DVR, the playback starting with the data recorded at the scheduled start time.

18. The computer program product of claim 17, the computer-readable code further comprising:
   a module for playing back at least a portion of the video data recorded prior to the scheduled start time responsive to a command received during playback of the recorded video data.

19. The computer program product of claim 17, the computer-readable code further comprising:
   a module for displaying a user interface allowing selection of a recording start time prior to the scheduled start time;
   wherein the module for recording the video data starts recording at the selected recording start time.

20. The computer program product of claim 19, the computer-readable code further comprising:
   a module for displaying a graphical indication that a recording start time prior to the scheduled start time is selected.

21. The computer program product of claim 17, the computer-readable code further comprising:
   a module for displaying a counter counting a time base for the recorded video data.

22. The computer program product of claim 21, wherein the counter counts a time elapsed since the scheduled start time.

23. The computer program product of claim 21, wherein the counter counts the time base of data recorded between the record start and the scheduled start time as negative time.

24. A method of recording data, comprising:
   establishing a scheduled start time to start recording the data;
   recording the data, the recording starting at a time prior to the scheduled start time;
   responsive to a command to play the recorded data from a beginning, playing the recorded data starting with data recorded at the scheduled start time; and,
   displaying a counter indicating a time base for the recorded data, wherein the counter counts a time elapsed since the scheduled start time.

25. The method of claim 24, further comprising:
   responsive to receiving a command during playback of the data, playing back at least a portion of the data recorded prior to the scheduled start time.

26. The method of claim 24, wherein the recording step comprises the step of:
   recording the data onto a random-access recording medium.

27. The method of claim 24, wherein the counter counts data recorded between the record start and the scheduled start time as negative time.

28. The method of claim 24, further comprising the step of:
   displaying a user interface allowing selection of a record start time prior to the scheduled start time;
   wherein the recording step starts recording at the selected record start time.

29. A digital video recorder (DVR) for digitally recording video data, comprising:
   a random-access recording medium;
   an input for receiving the video data;
   a processor for controlling the operation of the DVR, and
   a program logic memory for storing program logic modules for execution by the processor, the modules comprising:
      a module for establishing a scheduled start time to start recording the video data to the recording medium;
      a module for recording the video data on the recording medium, the recording starting at a time prior to the scheduled start time;
      a module for playing back the recorded data responsive to a command received by the DVR, the playback starting with the data recorded at the scheduled start time;
      a module for displaying a counter counting a time base for the recorded video data, wherein the counter counts a time elapsed since the scheduled start time.

30. The DVR of claim 29, wherein the modules further comprise:
   a module for displaying a user interface allowing selection of a recording start time prior to the scheduled start time;
   wherein the module for recording the video data starts recording at the selected recording start time.

31. The DVR of claim 29, wherein the modules further comprise:
   a module for displaying a graphical indication that a recording start time prior to the scheduled start time is selected.

32. The DVR of claim 29, wherein the counter counts the time base of data recorded between the record start and the scheduled start time as negative time.

33. The DVR of claim 29, further comprising:
   a channel guide database operatively coupled to the processor for storing channel guide data, wherein the scheduled start time is established responsive to the channel guide data.

34. The DVR of claim 29, wherein the channel guide data identifies programs and further comprising:
   a criteria database operatively coupled to the processor for storing criteria for selecting one or more of the programs identified by the channel guide data, wherein the scheduled start time is established responsive to the one or more programs identified by the criteria database.

35. A computer program product comprising:
   a computer-usable medium storing instructions executed by a computer controlling a digital video recorder (DVR), the DVR adapted to receive video data, the computer-readable code comprising:
   a module establishing a scheduled time to start recording the video data;
   a module recording the video data starting at a time prior to the scheduled start time;

a module playing back the recorded data responsive to a command received by the DVR, the playback starting with the data recorded at the scheduled start time;

a module playing back at least a portion of the video data recorded prior to the scheduled start time responsive to a command received during playback of the recorded video data; and, a module displaying a counter counting a time base for the recorded video data, wherein the counter counts a time elapsed since the scheduled start time.

36. The computer program product of claim 35, the computer-readable code further comprising:

a module for displaying a user interface allowing selection of a recording start time prior to the scheduled start time;

wherein the module for recording the video data starts recording at the selected recording start time.

37. The computer program product of claim 35, the computer-readable code further comprising:

a module for displaying a graphical indication that a recording start time prior to the scheduled start time is selected.

38. The computer program product of claim 35, wherein the counter counts the time base of data recorded between the record start and the scheduled start time as negative time.

* * * * *